United States Patent [19]

Christoffers et al.

[11] Patent Number: 5,036,714

[45] Date of Patent: Aug. 6, 1991

[54] COUPLING DEVICE FOR CONTROLLING AXIAL THRUST FORCES

[75] Inventors: Bernd Christoffers, Wennigsen; Joachim Feldmann, Neustadt; Manfred Schult, Garbsen, all of Fed. Rep. of Germany

[73] Assignee: WABCO Fahrzeughremsen GmbH, Hanover, Fed. Rep. of Germany

[21] Appl. No.: 421,875

[22] Filed: Oct. 16, 1989

[30] Foreign Application Priority Data

Dec. 14, 1988 [DE] Fed. Rep. of Germany ....... 3842037

[51] Int. Cl.$^5$ .......................... G01L 5/13; G01L 1/00
[52] U.S. Cl. ............................... 73/862.57; 73/862.38
[58] Field of Search .......... 73/862.38, 862.57, 862.62, 73/862.68, 862.49; 213/46 R, 46 A; 280/446.1, 483

[56] References Cited

U.S. PATENT DOCUMENTS

| | | | |
|---|---|---|---|
| 2,469,126 | 5/1949 | Munro et al. | 213/46 A |
| 2,681,565 | 6/1954 | Kelk | 73/862.49 |
| 3,410,135 | 11/1968 | Reynaud | 73/862.38 |
| 4,864,874 | 9/1989 | Hafner | 73/862.57 |

FOREIGN PATENT DOCUMENTS

| | | |
|---|---|---|
| 2164325 | 6/1973 | Fed. Rep. of Germany . |
| 2752641 | 5/1979 | Fed. Rep. of Germany . |
| 3502275 | 7/1986 | Fed. Rep. of Germany . |
| 3530565 | 3/1987 | Fed. Rep. of Germany . |

Primary Examiner—Charles A. Ruehl
Attorney, Agent, or Firm—Horst M. Kasper

[57] ABSTRACT

The present invention provides an apparatus for recording the axial force exerted by a coupling device. This apparatus measures the pressure which the axial force exerts on an elastomer-type spring-like element and for this purpose a pressure sensor is mounted at a predetermined transfer shoulder between the elastomer-type spring-like element and the housing or the pull rod of the coupling device. As an alternative, the pressure sensor can be mounted in the elastomer-type spring-like element.

54 Claims, 1 Drawing Sheet

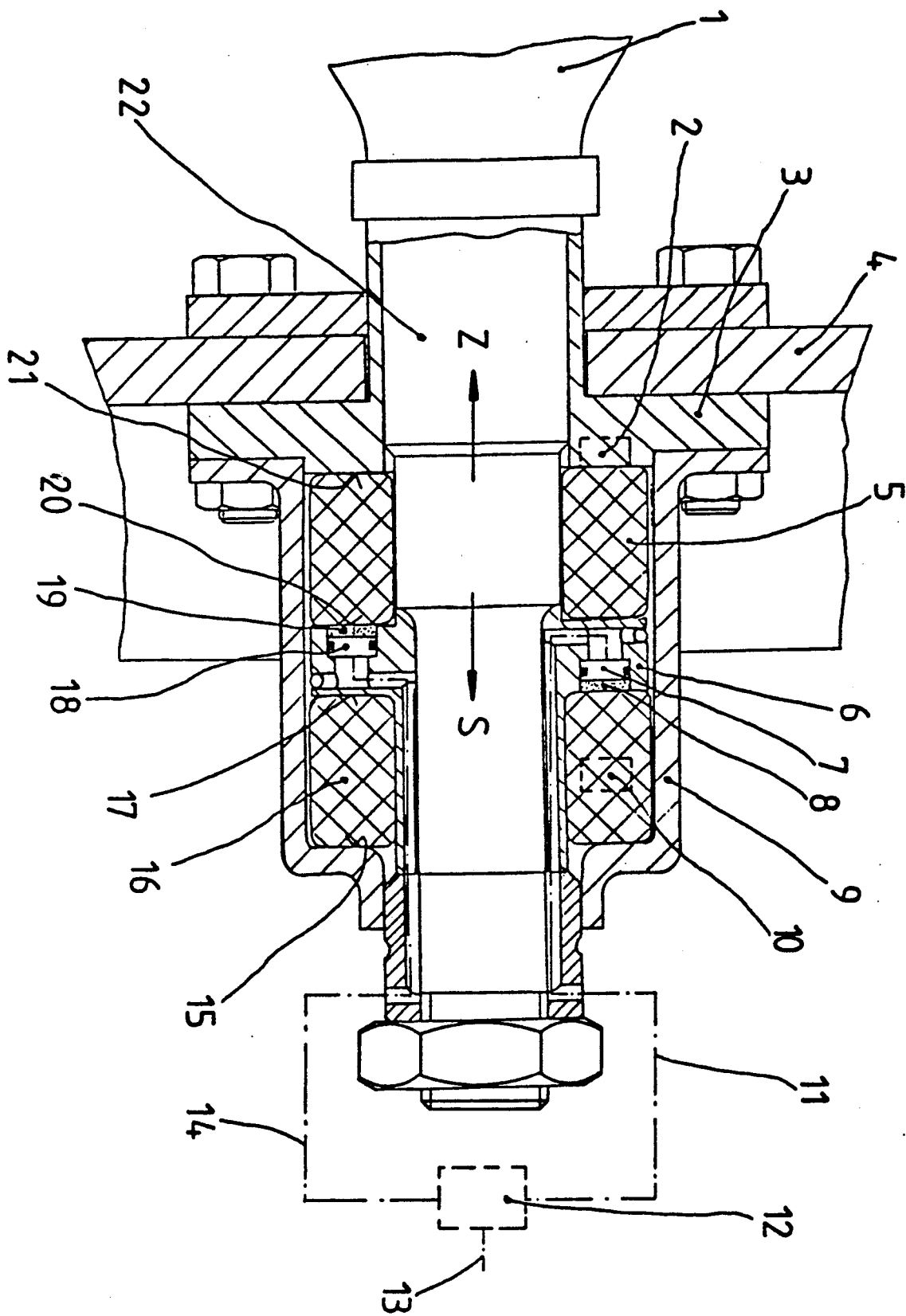

COUPLING DEVICE FOR CONTROLLING AXIAL THRUST FORCES

FIELD OF THE INVENTION

The present invention relates, in general, to equipment for measuring an axial force and, more particularly, this invention relates to an apparatus for measuring the axial forces on a vehicle, which are transmitted in a given direction to such vehicle by a coupling device secured to the vehicle and by way of a resilient spring-like element.

BACKGROUND OF THE INVENTION

Prior to the present invention, the equipment for measuring axial forces has been taught in the prior art. See, for example, publication WO 86/02323, especially FIG. 3. This publication describes equipment for measuring axial forces which utilizes an electric contact member which closes when the elastomer-type spring element has been compressed by a particular given dimension. This elastomer-type spring element is compressed under the impact of such axial force. One serious drawback with this prior art axial force measuring equipment is that such equipment will only indicate that an axial force is present. Furthermore, such equipment only indicates that this axial force has reached a predetermined force or that such axial force has exceeded such predetermined force. In other words, the actual axial force being exerted on such equipment cannot be measured with any degree of accuracy.

It should be obvious, therefore, that such equipment is not suitable for use in situations where some reaction will be required. This is particularly the case if such reaction corresponds to the size of the axial forces being encountered.

Also, it is known in the prior art from German publication DE 27 52 641 A1, that signals can be generated at a coupling. Such signals are generated in conjunction with a mechanical spring element, for various sizes of axial forces, which is combined with multiple-step switches. The switching steps of such multiple-step switches in this prior art mechanism are activated successively with an increasing spring action of such mechanical spring element. Further, this publication suggested the use of a multiple-step switch in combination with an elastomer spring element, as is currently known prior to the present invention. A logical extension of such above-described solution could be the replacement of the multiple-step switch with a linear-type sensor, for example. It is recognized that an elastomer spring element possesses the capability of indicating in a progressive manner the spring reaction as it is subjected to ever-increasing loads. As will be recognized by persons skilled in the art, signals generated at a coupling in the above-described manner have a number of disadvantages. For example, applications utilizing either the multiple-step switch or the linear sensor will exhibit, as far as the spring element itself is concerned, the disadvantage of decreased or loss of precision and resiliency with increasing axial forces being exerted thereon. Another highly significant disadvantage of such signals generated at the coupling in this manner is the non-linear path of such generated signals.

Further adding to the problems of the prior-art-type equipment used to measure the axial forces being exerted on a component is the environment such equipment must operate in. This is particularly the situation when such equipment is being used to measure the axial forces being exerted on a coupling used to connect a pair of vehicles together.

Additionally, in these prior art axial force measuring devices, compensation for certain interferences which can be caused, for example, by temperature reactions of the elastomer spring element and its time reaction, that is, the setting effect cannot be readily achieved. The zero point shift of such elastomer spring element also constitutes such an interference.

SUMMARY OF THE INVENTION

The present invention provides an apparatus for measuring an axial force that is transmitted by a coupling device in a predetermined direction by way of a resilient spring element onto a vehicle. In a first embodiment of the invention, a transfer shoulder positioned on a pull rod for a coupling device is provided. Such transfer shoulder faces such resilient spring element. The transfer shoulder is equipped with at least one pressure sensor which registers the pressure exerted by an axial force being applied to such resilient spring element during operation of such vehicle. In a second embodiment of the invention, a transfer shoulder positioned on a vehicle is provided. Such transfer shoulder also faces the resilient spring element and is equipped with at least one pressure sensor. Such at least one pressure sensor registers the pressure being exerted by an axial force being applied to the resilient spring element during operation of the vehicle. In a third and final embodiment of the present invention, there is at least one pressure sensor positioned within the resilient spring element. Such at least one pressure sensor registers the axial forces being exerted within such resilient spring element.

OBJECTS OF THE INVENTION

It is, therefore, one of the primary objects of the present invention to provide an apparatus for measuring the axial forces transmitted by a coupling device which, by relatively simple means, can generate signals which are indicative of the magnitude of such axial force.

Another object of the present invention is to provide an apparatus for measuring the axial forces transmitted by a coupling device which is substantially independent of the spring load characteristics of the elastomer spring element so that a generally perfect linear signal path with at least a continuous resiliency and continuous precision can be normally ensured.

Still another object of the present invention is to provide an apparatus for measuring the axial forces transmitted by a coupling device which because of the non-reliance on the spring load characteristics of the resilient spring element a considerable reduction of the hysteresis of the signals which are generated by such apparatus can be more readily achieved.

It is an additional object of the present invention to provide an apparatus for measuring the axial forces transmitted by a coupling device which, depending upon the particular type of interpretation of the signals provided by such apparatus, such apparatus can be used not only to measure such axial forces transmitted, but also as a control or instrumentation device which depends on these axial forces.

A further object of the present invention is to provide an apparatus for measuring the axial forces transmitted by a coupling device which can be used in a control system for axial thrust influenced braking systems.

Yet another object of the present invention is to provide an apparatus for measuring the axial forces transmitted by a coupling device which is capable of using reverse axial force in addition to the normal axial force.

Still a further object of the present invention is to provide an apparatus for measuring the axial forces transmitted by a coupling device which enables summation of signals from a number of pressure sensors in a number of directions into a single signal which can be used for a number of purposes.

Another object of the present invention is to provide an apparatus for measuring axial forces transmitted by a coupling device which allows for compensation of certain interferences that are caused by temperature reactions of the resilient spring element and its time reaction, i.e., setting effect.

A still further object of the present invention is to provide an apparatus for measuring axial forces transmitted by a coupling device in which the zero shift point of an elastomer spring element portion of such axial force measurement apparatus can be compensated for.

Yet still another object of the present invention is to provide an apparatus for measuring the axial forces transmitted by a coupling device which is relatively simple to maintain.

It is an additional object of the present invention to provide an apparatus for measuring an axial force transmitted by a coupling device in which the operational components can be protected against environmental contamination from dust and moisture.

Still a further object of the present invention is to provide an apparatus for measuring an axial force transmitted by a coupling device in which such axial force measurement apparatus and such coupling device can be manufactured as a self-contained unit.

Although a number of particular objects and advantages of the apparatus for measuring the axial forces transmitted by a coupling device have been described in detail above, it is believed that various other objects and advantages of the present invention will become more readily apparent to those persons who are skilled in the force measurement art from the following more detailed description of the invention particularly when such description is taken in conjunction with the attached drawing Figure and with the appended claims.

BRIEF DESCRIPTION OF THE DRAWING

The single FIGURE is a side elevation view partially in cross-section which illustrates a presently preferred embodiment of the apparatus for measuring the axial forces which are transmitted by a coupling device used to connect a pair of vehicles together adjacent their ends.

BRIEF DESCRIPTION OF THE INVENTION

Prior to proceeding to the more detailed description of this invention, it should be noted that as used hereinafter in both the specification and claims the term "vehicle" is meant to include railway-type vehicles as well as over-the-road-type vehicles and that such coupling device would be a railway coupler or an automotive-type coupler, respectively. Although not limited thereto, such over-the-road vehicle can be tandem trailers, for example.

For an appreciation of the present invention, reference is now made to the single drawing Figure. As is well known in the coupling art, during operation of the vehicles, the coupling device exerts an axial force. Such axial force is transmitted from one end of a vehicle to an adjacent end of another vehicle by means of a coupling jaw 1. For the sake of clarity, only a portion of such coupling jaw 1 is shown in the drawing. It should be evident from the drawing that the coupling device illustrated is an automotive-type coupler. It is also evident that the only portion of the vehicle which has been illustrated is the frame 4 and the bearing members or components 3 and 9 which are secured to such frame 4 by bolts. As will be discussed in greater detail hereinafter, the bearing members 3 and 9, which comprise a portion of the vehicle, form, according to the present invention, a housing member for some of the components of such apparatus for measuring the axial forces transmitted by such coupling device. It is to be understood, however, that the housing for such components can be a separate component of the apparatus if required. This may be the case, for example, when the apparatus is used in conjunction with a railway car coupling device.

In addition to the coupling jaw 1, as illustrated, the coupling device includes a rod-like member 6 and 22 connected to such coupling jaw 1 as well as resilient spring elements 5 and 16. In the presently preferred embodiment of the invention, such resilient spring elements 5 and 16 are formed from an elastomer-type material. Such elastomer-type spring-like elements can be formed either as a single piece or as a number of separate pieces or units, if desired. The flanged portion 6 of the rod-like member 6 and 22 carries a pair of opposed transfer shoulders 17 and 20 formed thereon. Although the flanged portion 6 has been configured as an independent component and connected in a well known manner to the shaft portion 22 of the rod-like member 6 and 22, it is within the scope of the present invention for such flanged portion 6 and the shaft portion 22 of such rod-like member 6 and 22 to be manufactured as a single piece. In any event, the axial force transmitted by such coupling device can be either a pull force in a direction of the arrow (Z) or a push force in the direction of the arrow (S). It is also within the scope of the present invention to measure the axial force transmitted by the coupling device in both the pulling direction and the pushing direction.

When a pulling force occurs on the coupling device, it will be transmitted by the load bearing transfer shoulder 20 on the flanged portion 6 of the rod-like member 6 and 22 to the elastomer-type spring-like element 5 and from there onto a load bearing transfer shoulder 21 on the vehicle. Transfer shoulder 21 is located on the bearing member 3 of such vehicle. In this manner, such pulling force is converted into a pressure in such elastomer-type spring-like element 5. This pressure corresponds to the surface pressure being exerted on such elastomer-type spring-like element 5 by such transfer shoulder 20 carried on the flanged portion 6 of such rod-like member 6 and 22 as such elastomer-type spring-like element 5 is being compressed between transfer shoulders 20 and 21.

The present preferred embodiment of the invention also includes a mechanism for accommodating the axial force. This mechanism in the description of the invention which follows will be referred to as a force measurement device. For this purpose, such force measurement device includes a pressure sensor 18. Pressure sensor 18 is positioned in a first cavity formed in the flanged portion 6 of the rod-like member 6 and 22 adjacent the transfer shoulder 20. Also disposed in the first cavity in such flanged portion 6 is a pressure transmitter 19. Such pressure transmitter 19 is positioned intermediate the pressure sensor 18 and the elastomer-type spring-like element 5. The pressure transmitter 19 consists of an elastomer material which in comparison to the elastomer material of such elastomer-type spring-like element 5 is so soft that it enables transmission of the prevailing pressure without modification on the pressure sensor 18. Consequently, the pressure sensor 18 is exposed to the actual pressure which the pull force is exerting in such elastomer-type spring-like element 5. At this point, the pressure sensor 18 emits an electrical signal over at least one electrical line 14. Such electrical signal has a value that reflects this actual pressure. Additionally, depending upon a particular application, this electrical signal reflecting such actual pressure may be fed through a plurality of electrical line 14. In view of the fact that the actual pressure in such elastomer-type spring-like element 5 is directly proportional to the pulling force on the coupling device, the electrical signal value emitted by such pressure sensor 18 can be used as a force signal and is designated accordingly as such force signal.

Now consider the case where such apparatus for measuring the axial forces transmitted by a vehicle coupling device is subjected to a pushing force instead of a pulling force. In this situation, the functioning of the apparatus is the same. To accomplish this function, the load transfer shoulder 17 carried opposite transfer shoulder 20 on the flanged portion 6 of the rod-like member 6 and 22 moves against the elastomer-type spring-like element 16, thereby compressing such elastomer-type spring-like element 5 between such transfer shoulder 17 and a load transfer shoulder 15 carried by the bearing member 9 secured to the vehicle frame 4. A pressure sensor 7 corresponding to pressure sensor 18 is disposed in a second cavity formed in the flanged portion 6 of the rod-like member 6 and 22 adjacent the transfer shoulder 17. Likewise, an elastomer pressure transmitter 8 which corresponds to pressure transmitter 19 is positioned in the second cavity intermediate the pressure sensor 7 and the elastomer-type spring-like element 16. At least one electrical line 11 carries an electrical signal having a signal value which reflects such pulling force from such pressure sensor 7.

As can be seen from the above description of the presently preferred embodiment of the invention, such apparatus for measuring the axial forces transmitted by a coupling device is capable of measuring both the pulling forces and the pushing forces transmitted by such coupling device. It is to be understood, however, that this apparatus can be configured for measuring either the pulling force or the pushing force alone. This can be accomplished simply by eliminating the respective pressure sensor 18 or 7 and/or the respective elastomer-type spring-like element 5 or 16 and/or other possible components such as the respective electrical lines 14 or 11.

Additionally, in the presently preferred embodiment of the invention, it will be customary for the elastomer-type spring-like element 5 or 16 or both of such elastomer-type spring-like elements 5 and 16 to be installed under a predetermined amount of pre-load pressure. Such pre-load pressure on such elastomer-type spring-like elements 5 and 16 must be at least sufficient to avoid the formation of peak pressures or surges. Such peak pressures can endanger the components forming the vehicle coupling device and/or the apparatus for measuring the axial forces transmitted by such coupling device and/or the vehicle itself. In the case where the axial force transmitted by the coupling device is to be measured in only a single direction, i.e., (Z or S), then the respective pressure sensor 18 or 7 must be adjusted to zero in the tabulation or summation unit 12. The function of such summation unit 12 will be described in greater detail hereinafter. On the other hand, if the axial force transmitted by such coupling device is to be measured in both directions, i.e., (Z and S), as illustrated in the drawing, then an adjustment to zero in both directions of the two pressure sensors 18 and 7 is almost impossible. The reason such zero adjustment in both directions is difficult is that a different setting and/or uneven temperatures of the elastomer-type spring-like elements 5 and 16 which can be encountered during operation would cause a zero point drift. For example, in those situations where the coupling device has to transmit primarily pulling forces, the respective elastomer-type spring-like element 5 will normally be under considerably heavier stress than the stress encountered by the elastomer-type spring-like element 16 during a pushing force transmitted by the coupling device. As a result, this will cause a substantially different setting reaction of the two elastomer-type spring-like elements 5 and 16 resulting in the above-described respectively heavy zero point drift of the pressure sensors 7 and 18.

Illustrated in the drawing is a summation unit 12. Such summation unit 12 assists in the compensation of the above-described disturbances encountered by the apparatus during normal operation. This summation unit 12 receives the electrical signal values from a pressure sensor 18 or 7 sent over electric lines 14 or 11, respectively, as a positive electrical signal value. The electrical signal of the other pressure sensor 7 or 18 is communicated to the summation unit 12 so that by means of a summation the electrical signals emit a measurement of the resulting axial force in proportion to the amount of such axial force and the direction of such axial force to another line designated 13. As a consequence of the summation in summation unit 12 of the electrical signals given out by the pressure sensors 18 and 7, such summation unit 12 will provide on line 13 an undisturbed electrical signal. This undisturbed electrical signal on line 13 can be used effectively as a force signal in a number of applications. Such applications may be of a critical nature such as braking the vehicle. In any event, the invention is not limited to any particular end application for the apparatus for measuring an axial force.

It is, also, to be understood that the pressure sensors 7 and 18 can be located in ways and positions other than as illustrated in the drawing, i.e., such pressure sensors 7 and 18 could be located on the respective load transfer shoulders 20 and 17 instead of in the respective cavities formed in the flanged portion 6 of the rod-like member 6 and 22. Furthermore, several pressure sensors can be arranged in an substantially equal distribution on the respective load transfer shoulders 17 and 20. As illustrated in the drawing, each of the pressure sensors 7 and 18 completely fill the allotted space in their respective cavity. However, such pressure sensors 7 and 18 can also be arranged to fill only a portion of their respective cavity as long as they are capable of fulfilling the function intended in an effective manner.

It should be clear that each pressure sensor 7 and 18 can be mounted independently on one or the other of such load transfer shoulder 17 or 20 of the flanged portion 6 of the rod-like member 6 and 22. Such pressure sensors 7 and 18 can also be mounted at any one of the respective elastomer-type spring-like element 5 and 16 on the pressure shoulder facing the vehicle. Such load bearing shoulders are illustrated in the drawing as shoulder 21 on the part 3 and shoulder 15 of the part 9 of such vehicle. The position of a pressure sensor mounted in this manner is illustrated in the drawing by a dotted rectangle identified as 2. From this showing, those persons skilled in the art will recognize how to position such pressure sensors in other alternate locations if desired for a particular application.

It is considered to be within the scope of the present invention for each pressure sensor to be positioned independently from a respective elastomer-type spring-like element 5 or 16. For example, such pressure sensor may be molded into the elastomer material making up the elastomer-type spring-like element. Such a position of a pressure sensor has been illustrated in the drawing by a dotted rectangle identified by the numeral 10.

It should be readily apparent to those persons skilled in the art of measuring axial forces from the above description that the various arrangements for the pressure sensors 7 and 18 can be applied for all such load bearing transfer shoulders 17 and 20 of the flanged portion 6 of the rod-like member 6 and 22 in their respective positions. However, the location illustrated in the drawing of such pressure sensors 7 and 18 at their respective transfer shoulders 17 and 20 of the flanged portion 6 of such rod-like member 6 and 22 constitutes the presently preferred arrangement of such pressure sensors 7 and 18. This arrangement is preferred because as the respective axial force is being absorbed as closely as possible at the point of the force entry, any interference that might be incurred due to friction in the elastomer-type spring-like elements 5 and 16 positioned in part 9 of the housing or friction on the pull force rod-like member 6 and 22 can generally be avoided or at least minimized.

In each of the above-described arrangements, possibilities for the apparatus for measuring the axial force transmitted by a coupling device, it should be noted that, the pressure sensors 2, 7, 10 and 18 and the elastomer-type spring-like elements 5 and 16 located inside one of the bearing parts 3 and 9 which form the housing of such apparatus are protected against undesirable contamination from the environment. Such environmental contamination being in the form of dirt and/or moisture. Furthermore, the housing makes it possible to manufacture, adjust, position and mount the coupling and the above-described apparatus for measuring the axial forces transmitted by the coupling device as a self-contained entity. This would particularly be the case when such coupling arrangement is an automotive-type coupler.

Although a presently preferred, as well as a number of alternative arrangements for an apparatus for measuring the axial forces transmitted by a coupling device have been described above, it should be obvious to persons skilled in the force measuring art that various other modifications and adaptations of such apparatus according to the present invention can be made without departing from the spirit and the scope of the appended claims.

We claim:

1. An apparatus for measuring an axially directed force which is transmitted in at least one predetermined direction by a coupling mechanism utilized to connect one end of a first vehicle to an adjacent end of a second vehicle, said axially directed force being transmitted during movement of such first vehicle and such second vehicle over at least one of a roadway surface and a railway surface, said apparatus for measuring said axially directed force comprising:
   (a) a generally hollow housing member, said generally hollow housing member having a capability of being engaged with at least one of such one end of such first vehicle and such adjacent end of such second vehicle;
   (b) at least one load bearing load transfer shoulder being carried by said generally hollow housing member, said at least one load bearing load transfer shoulder being located in a first predetermined plane, said first predetermined plane being disposed substantially perpendicular to a longitudinal axis of said generally hollow housing member;
   (c) a rod-like member, at least a portion of said rod-like member being disposed for axial movement within said generally hollow housing member, said rod-like member having a longitudinal axis which is disposed at least substantially parallel to said longitudinal axis of said generally hollow housing member;
   (d) a flange-like portion, said flange-like portion being disposed on a portion of an outer surface of said rod-like member intermediate each end of said rod-like member;
   (e) at least one load bearing load transfer shoulder being carried by said flange-like portion on said rod-like member, said at least one load bearing load transfer shoulder carried by said flange-like portion on said rod-like member faces said at least one load bearing load transfer shoulder carried by said generally hollow housing member in a substantially parallel manner and is disposed in a first predetermined plane which is substantially perpendicular to said longitudinal axis of said rod-like member;
   (f) at least one resilient spring-like element having a first end thereof positioned to abuttingly engage said at least one load bearing load transfer shoulder carried by said generally hollow housing member and an opposed second end thereof positioned to abuttingly engage said at least one load bearing load transfer shoulder carried by said flange-like portion of said rod-like member; and
   (g) at least one pressure sensing means positioned to face a predetermined end of said at least one resilient spring-like element for measuring an amount of pressure being exerted by an axial force being applied to said at least one resilient spring-like element in said at least one predetermined direction by such coupling mechanism during operation of such first vehicle and such second vehicle; wherein said at least one resilient spring-like element is formed as a generally solid element from an elastomeric-type material;
wherein said at least one resilient spring-like element is positioned between said at least one load bearing load transfer shoulder carried by said generally hollow housing member and said at least one load bearing load transfer shoulder carried by said flange-like portion of said rod-like member under a predetermined amount of prestress.

2. An apparatus for measuring an axial force being transmitted by a vehicle coupling mechanism, according to claim 1, wherein said rod-like member forms at least a portion of a coupling jaw member of such coupling mechanism.

3. An apparatus for measuring an axial force being transmitted by a vehicle coupling mechanism, according to claim 1, wherein said flange-like portion of said rod-like member includes at least one cavity formed therein adjacent said at least one load bearing load transfer shoulder and said at least one pressure sensing means is positioned at least partially within said at least one cavity.

4. An apparatus for measuring an axial force being transmitted by a vehicle coupling mechanism, according to claim 3, wherein said at least one pressure sensing means is positioned completely within said at least one cavity.

5. An apparatus for measuring an axial force being transmitted by a vehicle coupling mechanism, according to claim 4, wherein said apparatus further includes a pressure transfer element disposed intermediate said at least one pressure sensing means and said predetermined end of said at least one resilient spring-like element.

6. An apparatus for measuring an axial force being transmitted by a vehicle coupling mechanism, according to claim 1, wherein said longitudinal axis of said generally hollow housing member is located substantially on said longitudinal axis of said rod-like member.

7. An apparatus for measuring an axial force being transmitted by a vehicle coupling mechanism, according to claim 1, wherein said generally hollow housing member substantially prevents environmental contamination of each of said at least one resilient spring-like element and said at least one pressure sensing means.

8. An apparatus for measuring an axial force being transmitted by a vehicle coupling mechanism, according to claim 1, wherein said generally hollow housing member is removably secured to one of such one end of such first vehicle and such adjacent end of such second vehicle.

9. An apparatus for measuring an axial force being transmitted by a vehicle coupling mechanism, according to claim 1, wherein said generally hollow housing member includes at least one cavity formed therein adjacent said at least one load bearing load transfer shoulder carried thereby and said at least one pressure sensing means is positioned at least partially within said at least one cavity.

10. An apparatus for measuring an axial force being transmitted by a vehicle coupling mechanism, according to claim 9, wherein said at least one pressure sensing means is positioned completely within said at least one cavity included in said generally hollow housing member.

11. An apparatus for measuring an axial force being transmitted by a vehicle coupling mechanism, according to claim 9, wherein said apparatus further includes a pressure transfer element disposed intermediate said at least one pressure sensing means and said predetermined end of said at least one resilient spring-like element.

12. An apparatus for measuring an axial force being transmitted by a vehicle coupling mechanism, according to claim 1, wherein said apparatus further includes:
(a) at least a second load bearing load transfer shoulder being carried by said generally hollow housing member, said at least a second load bearing load transfer shoulder being located in a second predetermined plane which is substantially perpendicular to said longitudinal axis of said generally hollow housing member, each of said at least one load bearing load transfer shoulder and said at least a second load bearing load transfer shoulder being carried by said generally hollow housing member being substantially parallel to one another;
(b) at least a second load bearing load transfer shoulder being carried by said flange-like portion of said rod-like member, said at least a second load bearing load transfer shoulder being carried by said flange-like portion of said rod-like member facing said at least a second load bearing load transfer shoulder carried by said generally hollow housing member and being in a second predetermined plane which is substantially perpendicular to said longitudinal axis of said rod-like member, each of said at least one load bearing load transfer shoulder and said at least a second load bearing load transfer shoulder being carried by said flange-like portion of said rod-like member being substantially parallel to one another; and
(c) at least a second resilient spring-like element, a first end of said at least a second resilient spring-like element is positioned to abuttingly engage said at least a second load bearing load transfer shoulder carried by said generally hollow housing member and an opposed second end of said at least a second resilient spring-like element is positioned to abuttingly engage said at least a second load bearing load transfer shoulder carried by said flange-like portion on said rod-like member.

13. An apparatus for measuring an axial force being transmitted by a vehicle coupling mechanism, according to claim 12, wherein said apparatus measures an axial force transmitted by a coupling vehicle in a pair of substantially axially opposed directions and said apparatus further includes at least a second pressure sensing means positioned to face a predetermined end of said at least a second resilient spring-like element for measuring an amount of pressure being exerted by an axial force being applied to said at least a second resilient spring-like element in a substantially axially opposite direction to said at least one predetermined direction by such coupling mechanism during operation of such vehicle.

14. An apparatus for measuring an axial force being transmitted by a vehicle coupling mechanism, according to claim 13, wherein each of said at least one resilient spring-like element and said at least a second resilient spring-like element is formed as a generally solid element from an elastomer-type material.

15. An apparatus for measuring an axial force being transmitted by a vehicle coupling mechanism, according to claim 14, wherein said each of said at least one resilient spring-like element and said at least a second resilient spring-like element include an aperture formed therethrough to enable passing a portion of said rod-like member through said aperture.

16. An apparatus for measuring an axial force being transmitted by a vehicle coupling mechanism, according to claim 14, wherein said rod-like member forms at least a portion of a coupling jaw member of such coupling mechanism.

17. An apparatus for measuring an axial force being transmitted by a vehicle coupling mechanism, according to claim 16, wherein said flange-like portion on said rod-like member includes at least one cavity formed therein adjacent said at least one load bearing load transfer shoulder in which said at least one pressure sensing means is at least partially positioned and at least a second cavity formed therein adjacent said at least a second load bearing load transfer shoulder in which said at least a second pressure sensing means is at least partially positioned.

18. An apparatus for measuring an axial force being transmitted by a vehicle coupling mechanism, according to claim 17, wherein said at least one pressure sensing means is positioned completely within said at least one cavity and said at least a second pressure sensing means is positioned completely within said at least a second cavity.

19. An apparatus for measuring an axial force being transmitted by a vehicle coupling mechanism, according to claim 18, wherein said apparatus further includes a first pressure transfer element disposed intermediate said at least one pressure sensing means and said predetermined end of said at least one resilient spring-like element and a second pressure transfer element disposed intermediate said at least a second pressure sensing means and said predetermined end of said at least a second resilient spring-like element.

20. An apparatus for measuring an axial force being transmitted by a vehicle coupling mechanism, according to claim 19, wherein each of said first pressure transfer element and said second pressure transfer element is formed from an elastomer-type material.

21. An apparatus for measuring an axial force being transmitted by a vehicle coupling mechanism, according to claim 20, wherein said elastomer-type material forming each of said first pressure transfer element and said second pressure transfer element is substantially identical.

22. An apparatus for measuring an axial force being transmitted by a vehicle coupling mechanism, according to claim 14, wherein said flange-like portion on said rod-like member includes at least one cavity formed therein adjacent said at least one load bearing load transfer shoulder in which said at least one pressure sensing means is at least partially positioned and at least a second cavity formed therein adjacent said at least a second load bearing load transfer shoulder in which said at least a second pressure sensing means is at least partially positioned.

23. An apparatus for measuring an axial force being transmitted by a vehicle coupling mechanism, according to claim 22, wherein said at least one pressure sensing means is positioned completely within said at least one cavity and said at least a second pressure sensing means is positioned completely within said at least a second cavity.

24. An apparatus for measuring an axial force being transmitted by a vehicle coupling mechanism, according to claim 23, wherein said apparatus further includes a first pressure transfer element disposed intermediate said at least one pressure sensing means and said predetermined end of said at least one resilient spring-like element and a second pressure transfer element disposed intermediate said at least a second pressure sensing means and said predetermined end of said at least a second resilient spring-like element.

25. An apparatus for measuring an axial force being transmitted by a vehicle coupling mechanism, according to claim 24, wherein each of said first pressure transfer element and said second pressure transfer element is formed from an elastomer-type material.

26. An apparatus for measuring an axial force being transmitted by a vehicle coupling mechanism, according to claim 25, wherein said elastomer-type material forming each of said first pressure transfer element and said second pressure transfer element is substantially identical.

27. An apparatus for measuring an axial force being transmitted by a vehicle coupling mechanism, according to claim 13, wherein said rod-like member forms at least a portion of a coupling jaw member of such coupling mechanism.

28. An apparatus for measuring an axial force being transmitted by a vehicle coupling mechanism, according to claim 13, wherein said flange-like portion on said rod-like member includes at least one cavity formed therein adjacent said at least one load bearing load transfer shoulder in which said at least one pressure sensing means is at least partially positioned end at least a second cavity formed therein adjacent said at least a second load bearing load transfer shoulder in which said at least a second pressure sensing means is at least partially positioned.

29. An apparatus for measuring an axial force being transmitted by a vehicle coupling mechanism, according to claim 28, wherein said at least one pressure sensing means is positioned completely within said at least one cavity and said at least a second pressure sensing means is positioned completely within said at least a second cavity.

30. An apparatus for measuring an axial force being transmitted by a vehicle coupling mechanism, according to claim 29, wherein said apparatus further includes a first pressure transfer element disposed intermediate said at least one pressure sensing means and said predetermined end of said at least one resilient spring-like element and a second pressure transfer element disposed intermediate said at least a second pressure sensing means and said predetermined end of said at least a second resilient spring-like element.

31. An apparatus for measuring an axially directed force which is transmitted in at least one predetermined direction by a coupling mechanism utilized to connect one end of a first vehicle to an adjacent end of a second vehicle, said axially directed force being transmitted during movement of such first vehicle and such second vehicle over at least one of a roadway surface and a railway surface, said apparatus for measuring said axially directed force comprising:

(a) a generally hollow housing member, said generally hollow housing member having a capability of being engaged with at least one of such one end of such first vehicle and such adjacent end of such second vehicle;

(b) at least one load bearing load transfer shoulder being carried by said generally hollow housing member, said at least one load bearing load transfer shoulder being located in a first predetermined plane, said first predetermined plane being disposed substantially perpendicular to a longitudinal axis of said generally hollow housing member;

(c) a rod-like member, at least a portion of said rod-like member being disposed for axial movement within said generally hollow housing member, said rod-like member having a longitudinal axis which is disposed at least substantially parallel to said longitudinal axis of said generally hollow housing member;

(d) a flange-like portion, said flange-like portion being disposed on a portion of an outer surface of said rod-like member intermediate each end of said rod-like member;

(e) at least one load bearing load transfer shoulder being carried by said flange-like portion on said rod-like member, said at least one load bearing load transfer shoulder carried by said flange-like portion on said rod-like member faces said at least one load bearing load transfer shoulder carried by said generally hollow housing member in a substantially parallel manner and is disposed in a first predetermined plane which is substantially perpendicular to said longitudinal axis of said rod-like member;

(f) at least one resilient spring-like element having a first end thereof positioned to abuttingly engage said at least one load bearing load transfer shoulder carried by said generally hollow housing member and an opposed second end thereof positioned to abuttingly engage said at least one load bearing load transfer shoulder carried by said flange-like portion of said rod-like member; and (g) at least one pressure sensing means positioned to face a predetermined end of said at least one resilient spring-like element for measuring an amount of pressure being exerted by an axial force being applied to said at least one resilient spring-like element in said at least one predetermined direction by such coupling mechanism during operation of such first vehicle and such second vehicle, wherein said at least one resilient spring-like element is formed as a generally solid element from an elastomer-type material, wherein said flange-like portion of said rod-like member includes at least one cavity formed therein adjacent said at least one load bearing load transfer shoulder and said at least one pressure sensing means is positioned at least partially within said at least one cavity, wherein said apparatus further includes a pressure transfer element disposed intermediate said at least one pressure sensing means and said predetermined end of said at least one resilient spring-like element, wherein said pressure transfer element is formed from an elastomer-type material, wherein said elastomer-type material forming said pressure transfer element is softer than said elastomer-type material forming said resilient spring-like element.

32. An apparatus for measuring an axially directed force which is transmitted in at least one predetermined direction by a coupling mechanism utilized to connect one end of a first vehicle to an adjacent end of a second vehicle, said axially directed force being transmitted during movement of such first vehicle and such second vehicle over at least one of a roadway surface and a railway surface, said apparatus for measuring said axially directed force comprising:

(a) a generally hollow housing member, said generally hollow housing member having a capability of being engaged with at least one of such one end of such first vehicle and such adjacent end of such second vehicle;

(b) at least one load bearing load transfer shoulder being carried by said generally hollow housing member, said at least one load bearing load transfer shoulder being located in a first predetermined plane, said first predetermined plane being disposed substantially perpendicular to a longitudinal axis of said generally hollow housing member;

(c) a rod-like member, at least a portion of said rod-like member being disposed for axial movement within said generally hollow housing member, said rod-like member having a longitudinal axis which is disposed at least substantially parallel to said longitudinal axis of said generally hollow housing member;

(d) a flange-like portion, said flange-like portion being disposed on a portion of an outer surface of said rod-like member intermediate each end of said rod-like member;

(e) at least one load bearing load transfer shoulder being carried by said flange-like portion on said rod-like member, said at least one load bearing load transfer shoulder carried by said flange-like portion on said rod-like member faces said at least one load bearing load transfer shoulder carried by said generally hollow housing member in a substantially parallel manner and is disposed in a first predetermined plane which is substantially perpendicular to said longitudinal axis of said rod-like member;

(f) at least one resilient spring-like element having a first end thereof positioned to abuttingly engage said at least one load bearing load transfer shoulder carried by said generally hollow housing member and an opposed second end thereof positioned to abuttingly engage said at least one load bearing load transfer shoulder carried by said flange-like portion of said rod-like member; and (g) at least one pressure sensing means positioned to face a predetermined end of said at least one resilient spring-like element for measuring an amount of pressure being exerted by an axial force being applied to said at least one resilient spring-like element in said at least one predetermined direction by such coupling mechanism during operation of such first vehicle and such second vehicle, wherein said at least one resilient spring-like element is formed as a generally solid element from a elastomer-type material, wherein said rod-like member forms at least a portion of a coupling jaw member of such coupling mechanism, wherein said flange-like portion of said rod-like member includes at least one cavity formed therein adjacent said at least one load bearing load transfer shoulder and least partially within said at least one cavity, wherein said apparatus further includes a pressure transfer element disposed intermediate said at least one pressure sensing means and said predetermined end of said at least one resilient spring-like element, wherein said pressure transfer element is formed from an elastomer-type material, wherein said elastomer-type material forming said pressure transfer element is softer than said elastomer-type material forming said resilient spring-like element.

33. An apparatus for measuring an axially directed force which is transmitted in at least one predetermined direction by a coupling mechanism utilized to connect one end of a first vehicle to an adjacent end of a second vehicle, said axially directed force being transmitted during movement of such first vehicle and such second vehicle over at least one of a roadway surface and a railway surface, said apparatus for measuring said axially directed force comprising:

(a) a generally hollow housing member, said generally hollow housing member having a capability of being engaged with at least one of such one end of such first vehicle and such adjacent end of such second vehicle;

(b) at least one load bearing load transfer shoulder being carried by said generally hollow housing member, said at least one load bearing load transfer shoulder being located in a first predetermined plane, said first predetermined plane being disposed substantially perpendicular to a longitudinal axis of said generally hollow housing member;

(c) a rod-like member, at least a portion of said rod-like member being disposed for axial movement within said generally hollow housing member, said rod-like member having a longitudinal axis which is disposed at least substantially parallel to said longitudinal axis of said generally hollow housing member;

(d) a flange-like portion, said flange-like portion being disposed on a portion of an outer surface of said rod-like member intermediate each end of said rod-like member;

(e) at least one load bearing load transfer shoulder being carried by said flange-like portion on said rod-like member, said at least one load bearing load transfer shoulder carried by said flange-like portion on said rod-like member faces said at least one load bearing load transfer shoulder carried by said generally hollow housing member in a substantially parallel manner and is disposed in a first predetermined plane which is substantially perpendicular to said longitudinal axis of said rod-like member;

(f) at least one resilient spring-like element having a first end thereof positioned to abuttingly engage said at least one load bearing load transfer shoulder carried by said generally hollow housing member and an opposed second end thereof positioned to abuttingly engage said at least one load bearing load transfer shoulder carried by said flange-like portion of said rod-like member; and (g) at least one pressure sensing means positioned to face a predetermined end of said at least one resilient spring-like element for measuring an amount of pressure being exerted by an axial force being applied to said at least one resilient spring-like element in said at least one predetermined direction by such coupling mechanism during operation of such first vehicle and such second vehicle, wherein said generally hollow housing member includes at least one cavity formed therein adjacent said at least one load bearing load transfer shoulder carried thereby and said at least one pressure sensing means is positioned at least partially within said at least one cavity, wherein said apparatus further includes a pressure transfer element disposed intermediate said at least one pressure sensing means and said predetermined end of said at least one resilient spring-like element, wherein said at least one resilient spring-like element is formed as a generally solid element from an elastomer-type material and said pressure transfer element is formed from an elastomer-type material which is softer than said elastomer-type material forming said resilient spring-like element.

34. An apparatus for measuring an axially directed force which is transmitted in at least one predetermined direction by a coupling mechanism utilized to connect one end of a first vehicle to an adjacent end of a second vehicle, said axially directed force being transmitted during movement of such first vehicle and such second vehicle over at least one of a roadway surface and a railway surface, said apparatus for measuring said axially directed force comprising:

(a) a generally hollow housing member, said generally hollow housing member having a capability of being engaged with at least one of such one end of such first vehicle and such adjacent end of such second vehicle;

(b) at least one load bearing load transfer shoulder being carried by said generally hollow housing member, said at least one load bearing load transfer shoulder being located in a first predetermined plane, said first predetermined plane being disposed substantially perpendicular to a longitudinal axis of said generally hollow housing member;

(c) a rod-like member, at least a portion of said rod-like member being disposed for axial movement within said generally hollow housing member, said rod-like member having a longitudinal axis which is disposed at least substantially parallel to said longitudinal axis of said generally hollow housing member;

(d) a flange-like portion, said flange-like portion being disposed on a portion of an outer surface of said rod-like member intermediate each end of said rod-like member;

(e) at least one load bearing load transfer shoulder being carried by said flange-like portion on said rod-like member, said at least one load bearing load transfer shoulder carried by said flange-like portion on said rod-like member faces said at least one load bearing load transfer shoulder carried by said generally hollow housing member in a substantially parallel manner and is disposed in a first predetermined plane which is substantially perpendicular to said longitudinal axis of said rod-like member;

(f) at least one resilient spring-like element having a first end thereof positioned to abuttingly engage said at least one load bearing load transfer shoulder carried by said generally hollow housing member and an opposed second end thereof positioned to abuttingly engage said at least one load bearing load transfer shoulder carried by said flange-like portion of said rod-like member; and (g) at least one pressure sensing means positioned to face a predetermined end of said at least one resilient spring-like element for measuring an amount of pressure being exerted by an axial force being applied to said at least one resilient spring-like element in said at least one predetermined direction by such coupling mechanism during operation of such first vehicle and such second vehicle, wherein said apparatus further includes:

(h) at least a second load bearing load transfer shoulder being carried by said generally hollow housing member, said at least a second load bearing load transfer shoulder being located in a second predetermined plane which is substantially perpendicular to said longitudinal axis of said generally hollow housing member, each of said at least one load bearing load transfer shoulder and said at least a second load bearing load transfer shoulder being carried by generally hollow housing member being substantially parallel to one another;

(i) at least a second load bearing load transfer shoulder being carried by said flange-like portion of said rod-like member, said at least a second load bearing load transfer shoulder being carried by said flange-like portion of said rod-like member facing said at least a second load bearing load transfer shoulder carried by said generally hollow housing member and being in a second predetermined plane which is substantially perpendicular to said longitudinal axis of said rod-like member, each of said at least one load bearing load transfer shoulder and said at least a second load bearing load transfer shoulder being carried by said flange-like portion of said rod-like member being substantially parallel to one another; and (j) at least a second resilient spring-like element, a first end of said at least a second resilient spring-like element is positioned to abuttingly engage said at least a second load bearing load transfer shoulder carried by said generally hollow housing member and an opposed second end of said at least a second resilient spring-like element is positioned to abuttingly engage said at least a second load bearing load transfer shoulder carried by said flange-like portion on said rod-like member, wherein said apparatus measures an axial force transmitted by a coupling vehicle in a pair of substantially axially opposed directions and said apparatus further includes at least a second pressure sensing means positioned to face a predetermined end of said at least a second resilient spring-like element for measuring an amount of pressure being exerted by an axial force being applied to said at least a second resilient spring-like element in a substantially axially opposite direction to said at least one predetermined direction by such coupling mechanism during operation of such vehicle, wherein each of said at least one resilient spring-like element and said at least a second resilient spring-like element is formed as a generally solid element from an elastomer-type material, wherein said each of said at least one resilient spring-like element and said at least a second resilient spring-like element include an aperture formed therethrough to enable passing a portion of said rod-like member through said aperture, wherein said at least one resilient spring-like element is positioned between said at least one load bearing load transfer shoulder carried by said generally hollow housing member and said at least one load bearing load transfer shoulder carried by said flange-like portion on said rod-like member under a predetermined amount of prestress and said at least a second resilient spring-like element is positioned between said at least a second load bearing load transfer shoulder carried by said generally hollow housing member and said at least a second load bearing load transfer shoulder carried by said flange-like portion on said rod-like member under a substantially identical amount of prestress as said at least one resilient spring-like element.

35. An apparatus for measuring an axially directed force which is transmitted in at least one predetermined direction by a coupling mechanism utilized to connect one end of a first vehicle to an adjacent end of a second vehicle, said axially directed force being transmitted during movement of such first vehicle and such second vehicle over at least one of a roadway surface and a railway surface, said apparatus for measuring said axially directed force comprising:

(a) a generally hollow housing member, said generally hollow housing member having a capability of being engaged with at least one of such one end of such first vehicle and such adjacent end of such second vehicle;

(b) at least one load bearing load transfer shoulder being carried by said generally hollow housing member, said at least one load bearing load transfer shoulder being located in a first predetermined plane, said first predetermined plane being disposed substantially perpendicular to a longitudinal axis of said generally hollow housing member;

(c) rod-like member, at least a portion of said rod-like member being disposed for axial movement within said generally hollow housing member, said rod-like member having a longitudinal axis which is disposed at least substantially parallel to said longitudinal axis of said generally hollow housing member;

(d) a flange-like portion, said flange-like portion being disposed on a portion of an outer surface of said rod-like member intermediate each end of said rod-like member;

(e) at least one load bearing load transfer shoulder being carried by said flange-like portion on said rod-like member, said at least one load bearing load transfer shoulder carried by said flange-like portion on said rod-like member faces said at least one load bearing load transfer shoulder carried by said generally hollow housing member in a substantially parallel manner and is disposed in a first predetermined plane which is substantially perpendicular to said longitudinal axis of said rod-like member;

(f) at least one resilient spring-like element having a first end thereof positioned to abuttingly engage said at least one load bearing load transfer shoulder carried by said generally hollow housing member and an opposed second end thereof positioned to abuttingly engage said at least one load bearing load transfer shoulder carried by said flange-like portion of said rod-like member; and (g) at least one pressure sensing means positioned to face a predetermined end of said at least one resilient spring-like element for measuring an amount of pressure being exerted by an axial force being applied to said at least one resilient spring-like element in said at least one predetermined direction by such coupling mechanism during operation of such first vehicle and such second vehicle, wherein said apparatus further includes:

(h) at least a second load bearing load transfer shoulder being carried by said generally hollow housing member, said at least a second load bearing load transfer shoulder being located in a second predetermined plane which is substantially perpendicular to said longitudinal axis of said generally hollow housing member, each of said at least one load bearing load transfer shoulder and said at least a second load bearing load transfer shoulder being carried by said generally hollow housing member being substantially parallel to one another;

(i) at least a second load bearing load transfer shoulder being carried by said flange-like portion of said rod-like member, said at least a second load bearing load transfer shoulder being carried by said flange-like portion of said rod-like member facing said at least a second load bearing load transfer shoulder carried by said generally hollow housing member and being in a second predetermined plane which is substantially perpendicular to said longitudinal axis of said rod-like member, each of said at least one load bearing load transfer shoulder and said at least a second load bearing load transfer shoulder being carried by said flange-like portion of said rod-like member being substantially parallel to one another; and (j) at least a second resilient spring-like element, a first end of said at least a second resilient spring-like element is positioned to abuttingly engage said at least a second load bearing load transfer shoulder carried by said generally hollow housing member and an opposed second end of said at least a second resilient spring-like element is positioned to abuttingly engage said at least a second load bearing load transfer shoulder carried by said flange-like portion on said rod-like member, wherein said apparatus measures an axial force transmitted by a coupling vehicle in a pair of substantially axially opposed directions and said apparatus further includes at least a second pressure sensing means positioned to face a predetermined end of said at least a second resilient spring-like element for measuring an amount of pressure being exerted by an axial force being applied to said at least a second resilient spring-like element in a substantially axially opposite direction to said at least one predetermined direction by such coupling mechanism during operation of such vehicle, wherein each of said at least one resilient spring-like element and said at least a second resilient spring-like element is formed as a generally solid element from an elastomer-type material, wherein said flange-like portion on said rod-like member includes at least one cavity formed therein adjacent said at least one load bearing load transfer shoulder in which said at least one pressure sensing means is at least partially positioned and at least a second cavity formed therein adjacent said at least a second load bearing load transfer shoulder in which said at least a second pressure sensing means is at least partially positioned, wherein said apparatus further includes a first pressure transfer element disposed intermediate said at least one pressure sensing means and said predetermined end of said at least one resilient spring-like element and a second pressure transfer element disposed intermediate said at least a second pressure sensing means and said predetermined end of said at least a second resilient spring-like element, wherein each of said first pressure transfer element and said second pressure transfer element is formed from an elastomer-type material, wherein said elastomer-type material forming each of said first pressure transfer element and said second pressure transfer element is substantially identical, wherein said elastomer-type material forming said each of said first pressure transfer element and said second pressure transfer element is softer than said elastomer-type material forming said each of said at least one resilient spring-like element and said at least a second resilient spring-like element.

36. An apparatus for measuring an axially directed force which is transmitted in at least one predetermined direction by a coupling mechanism utilized to connect one end of a first vehicle to an adjacent end of a second vehicle, said axially directed force being transmitted during movement of such first vehicle and such second vehicle over at least one of a roadway surface and a railway surface, said apparatus for measuring said axially directed force comprising:

(a) a generally hollow housing member, said generally hollow housing member having a capability of being engaged with at least one of such one end of such first vehicle and such adjacent end of such second vehicle;

(b) at least one load bearing load transfer shoulder being carried by said generally hollow housing member, said at least one load bearing load transfer shoulder being located in a first predetermined plane, said first predetermined plane being disposed substantially perpendicular to a longitudinal axis of said generally hollow housing member;

(c) a rod-like member, at least a portion of said rod-like member being disposed for axial movement within said generally hollow housing member, said rod-like member having a longitudinal axis which is disposed at least substantially parallel to said longitudinal axis of said generally hollow housing member;

(d) a flange-like portion, said flange-like portion being disposed on a portion of an outer surface of said rod-like member intermediate each end of said rod-like member;

(e) at least one load bearing load transfer shoulder being carried by said flange-like portion on said rod-like member, said at least one load bearing load transfer shoulder carried by said flange-like portion on said rod-like member faces said at least one load bearing load transfer shoulder carried by said generally hollow housing member in a substantially parallel manner and is disposed in a first predetermined plane which is substantially perpendicular to said longitudinal axis of said rod-like member;

(f) at least one resilient spring-like element having a first end thereof positioned to abuttingly engage said at least one load bearing load transfer shoulder carried by said generally hollow housing member and an opposed second end thereof positioned to abuttingly engage said at least one load bearing load transfer shoulder carried by said flange-like portion of said rod-like member; and (g) at least one pressure sensing means positioned to face a predetermined end of said at least one resilient spring-like element for measuring an amount of pressure being exerted by an axial force being applied to said at least one resilient spring-like element in said at least one predetermined direction by such coupling mechanism during operation of such first vehicle and such second vehicle, wherein said apparatus further includes:

(h) at least a second load bearing load transfer shoulder being carried by said generally hollow housing member, said at least a second load bearing load transfer shoulder being located in a second predetermined plane which is substantially perpendicular to said longitudinal axis of said generally hollow housing member, each of said at least one load bearing load transfer shoulder and said at least a second load bearing load transfer shoulder being carried by said generally hollow housing member being substantially parallel to one another;

(i) at least a second load bearing load transfer shoulder being carried by said flame-like portion of said rod-like member, said at least a second load bearing load transfer shoulder being carried by said flange-like portion of said rod-like member facing said at least a second load bearing load transfer shoulder carried by said generally hollow housing member and being in a second predetermined plane which is substantially perpendicular to said longitudinal axis of said rod-like member, each of said at least one load bearing load transfer shoulder and said at least a second load bearing load transfer shoulder being carried by said flange-like portion of said rod-like member being substantially parallel to one another; and (j) at least a second resilient spring-like element, a first end of said at least a second resilient spring-like element is positioned to abuttingly engage said at least a second load bearing load transfer shoulder carried by said generally hollow housing member and an opposed second end of said at least a second resilient spring-like element is positioned to abuttingly engage said at least a second load bearing load transfer shoulder carried by said flange-like portion on said rod-like member, wherein said apparatus measures an axial force transmitted by a coupling vehicle in a pair of substantially axially opposed directions and said apparatus further includes at least a second pressure sensing means positioned to face a predetermined end of said at least a second resilient spring-like element for measuring an amount of pressure being exerted by an axial force being applied to said at least a second resilient spring-like element in a substantially axially opposite direction to said at least one predetermined direction by such coupling mechanism during operation of such vehicle, wherein each of said at least one resilient spring-like element and said at least a second resilient spring-like element is formed as a generally solid element from an elastomer-type material, wherein said rod-like member forms at least a portion of a coupling jaw member of such coupling mechanism, wherein said flange-like portion on said rod-like member includes at least one cavity formed therein adjacent said at least one load bearing load transfer shoulder in which said at least one pressure sensing means is at least partially positioned and at least a second cavity formed therein adjacent said at least a second load bearing load transfer shoulder in which said at least a second pressure sensing means is at least partially positioned, wherein said apparatus further includes a first pressure transfer element disposed intermediate said at least one pressure sensing means and said predetermined end of said at least one resilient spring-like element and a second pressure transfer element disposed intermediate said at least a second pressure sensing means and said predetermined end of said at least a second resilient spring-like element, wherein each of said first pressure transfer element and said second pressure transfer element is formed from an elastomer-type material, wherein said elastomer-type material forming each of said first pressure transfer element and said second pressure transfer element is substantially identical, wherein said elastomer-type material forming said each of said first pressure transfer element and said second pressure transfer element is softer than said elastomer-type material forming said each of said at least one resilient spring-like element and said at least a second resilient spring-like element.

37. An apparatus for measuring an axial force being transmitted by a vehicle coupling mechanism, according to claim 36, wherein said apparatus further includes a summation unit which receives a positive signal from a first one of said at least one pressure sensing means and said at least a second pressure sensing means and a negative signal from a second one of said at least one pressure sensing means and said at least a second pressure sensing means, said summation unit generates a signal representing a resulting axial force according to both an amount of said axial force and a direction of said axial force from said positive signal and said negative signal.

38. An apparatus for measuring an axially directed force which is transmitted in at least one predetermined direction by a coupling mechanism utilized to connect one end of a first vehicle to an adjacent end of a second vehicle, said axially directed force being transmitted during movement of such first vehicle and such second vehicle over at least one of a roadway surface and a railway surface, said apparatus for measuring said axially directed force comprising:

(a) a generally hollow housing member, said generally hollow housing member having a capability of being engaged with at least one of such one end of such first vehicle and such adjacent end of such second vehicle;

(b) at least one load bearing load transfer shoulder being carried by said generally hollow housing member, said at least one load bearing load transfer shoulder being located in a first predetermined plane, said first predetermined plane being disposed substantially perpendicular to a longitudinal axis of said generally hollow housing member;

(c) a rod-like member, at least a portion of said rod-like member being disposed for axial movement within said generally hollow housing member, said rod-like member having a longitudinal axis which is disposed at least substantially parallel to said longitudinal axis of said generally hollow housing member;

(d) a flange-like portion, said flange-like portion being disposed on a portion of an outer surface of said rod-like member intermediate each end of said rod-like member;

(e) at least one load bearing load transfer shoulder being carried by said flange-like portion on said rod-like member, said at least one load bearing load transfer shoulder carried by said flange-like portion on aid rod-like member faces said at least one load bearing load transfer shoulder carried by said generally hollow housing member in a substantially parallel manner and is disposed in a first predetermined plane which is substantially perpendicular to said longitudinal axis of said rod-like member;

(f) at least one resilient spring-like element having a first end thereof positioned to abuttingly engage said at least one load bearing load transfer shoulder carried by said generally hollow housing member and an opposed second end thereof positioned to abuttingly engage said at least one load bearing load transfer shoulder carried by said flange-like portion of said rod-like member; and (g) at least one pressure sensing means positioned to face a predetermined end of said at least one resilient spring-like element for measuring an amount of pressure being exerted by an axial force being applied to said at least one resilient spring-like element in said at least one predetermined direction by such coupling mechanism during operation of such first vehicle and such second vehicle, wherein said apparatus further includes:

(h) at least a second load bearing load transfer shoulder being carried by said generally hollow housing member, said at least a second load bearing load transfer shoulder being located in a second predetermined plane which is substantially perpendicular to said longitudinal axis of said generally hollow housing member, each of said at least one load bearing load transfer shoulder and said at least a second load bearing load transfer shoulder being carried by said generally hollow housing member being substantially parallel to one another;

(i) at least a second load bearing load transfer shoulder being carried by said flange-like portion of said rod-like member, said at least a second load bearing load transfer shoulder being carried by said flange-like portion of said rod-like member facing said at least a second load bearing load transfer shoulder carried by said generally hollow housing member and being in a second predetermined plane which is substantially perpendicular to said longitudinal axis of said rod-like member, each of said at least one load bearing load transfer shoulder and said at least a second load bearing load transfer shoulder being carried by said flange-like portion of said rod-like member being substantially parallel to one another; and (j) at least a second resilient spring-like element, a first end of said at least a second resilient spring-like element is positioned to abuttingly engage said at least a second load bearing load transfer shoulder carried by said generally hollow housing member and an opposed second end of said at least a second resilient spring-like element is positioned to abuttingly engage said at least a second load bearing load transfer shoulder carried by said flange-like portion on said rod-like member,
wherein said apparatus measures an axial force transmitted by a coupling vehicle in a pair of substantially axially opposed directions and said apparatus further includes at least a second pressure sensing means positioned to face a predetermined end of said at least a second resilient spring-like element for measuring an amount of pressure being exerted by an axial force being applied to said at least a second resilient spring-like element in a substantially axially opposite direction to said at least one predetermined direction by such coupling mechanism during operation of such vehicle, wherein said apparatus further includes a summation unit which receives a positive signal from first one of said at least one pressure sensing means and said at least a second pressure sensing means and a negative signal from a second one of said at least one pressure sensing means and said at least a second pressure sensing means, said summation unit generates a signal representing a resulting axial force according to both an amount of said axial force and a direction of said axial force from said positive signal and said negative signal.

39. An apparatus for measuring an axial force being transmitted by a vehicle coupling mechanism, according to claim 38, wherein said at least one resilient spring-like element is formed as a generally solid element from an elastomer-type material.

40. An apparatus for measuring an axial force being transmitted by a vehicle coupling mechanism, according to claim 39, wherein said rod-like member forms at least a portion of a coupling jaw member of such coupling mechanism.

41. An apparatus for measuring an axial force being transmitted by a vehicle coupling mechanism, according to claim 40, wherein said flange-like portion of said rod-like member includes at least one cavity formed therein adjacent said at least one load bearing load transfer shoulder and said at least one pressure sensing means is positioned at least partially within said at least one cavity.

42. An apparatus for measuring an axial force being transmitted by a vehicle coupling mechanism, according to claim 41, wherein said at least one pressure sensing means is positioned completely within said at least one cavity.

43. An apparatus for measuring an axial force being transmitted by a vehicle coupling mechanism, according to claim 42, wherein said apparatus further includes a pressure transfer element disposed intermediate said at least one pressure sensing means and said predetermined end of said at least one resilient spring-like element.

44. An apparatus for measuring an axial force being transmitted by a vehicle coupling mechanism, according to claim 43, wherein said pressure transfer element is formed from an elastomer-type material.

45. An apparatus for measuring an axial force being transmitted by a vehicle coupling mechanism, according to claim 39, wherein said flange-like portion of said rod-like member includes at least one cavity formed therein adjacent said at least one load bearing load transfer shoulder and said at least one pressure sensing means is positioned at least partially within said at least one cavity.

46. An apparatus for measuring an axial force being transmitted by a vehicle coupling mechanism, according to claim 45, wherein said at least one pressure sensing means is positioned completely within said at least one cavity.

47. An apparatus for measuring an axial force being transmitted by a vehicle coupling mechanism, according to claim 46, wherein said apparatus further includes a pressure transfer element disposed intermediate said at least one pressure sensing means and said predetermined end of said at least one resilient spring-like element.

48. An apparatus for measuring an axial force being transmitted by a vehicle coupling mechanism, according to claim 47, wherein said pressure transfer element is formed from an elastomer-type material.

49. An apparatus for measuring an axial force being transmitted by a vehicle coupling mechanism, according to claim 38, wherein said at least one resilient spring-like element is positioned between said at least one load bearing load transfer shoulder carried by said generally hollow housing member and said at least one load bearing load transfer shoulder carried by said flange-like portion of said rod-like member under a predetermined amount of prestress.

50. An apparatus for measuring an axially directed force which is transmitted in at least one predetermined direction by a coupling mechanism utilized to connect one end of a first vehicle to an adjacent end of a second vehicle, said axially directed force being transmitted during movement of such first vehicle and such second vehicle over at least one of a roadway surface and a railway surface, said apparatus for measuring said axially directed force comprising:

(a) a generally hollow housing member, said generally hollow housing member having a capability of being engaged with at least one of such one end of such first vehicle and such adjacent end of such second vehicle;

(b) at least one load bearing load transfer shoulder being carried by said generally hollow housing member, said at least one load bearing load transfer shoulder being located in a first predetermined plane, said first predetermined plane being disposed substantially perpendicular to a longitudinal axis of said generally hollow housing member;

(c) a rod-like member, at least a portion of said rod-like member being disposed for axial movement within said generally hollow housing member, said rod-like member having a longitudinal axis which is disposed at least substantially parallel to said longitudinal axis of said generally hollow housing member;

(d) a flange-like portion, said flange-like portion being disposed on a portion of an outer surface of said rod-like member intermediate each end of said rod-like member;

(e) at least one load bearing load transfer shoulder being carried by said flange-like portion on said rod-like member, said at least one load bearing load transfer shoulder carried by said flange-like portion on said rod-like member faces said at least one load bearing load transfer shoulder carried by said generally hollow housing member in a substantially parallel manner and is disposed in a first predetermined plane which is substantially perpendicular to said longitudinal axis of said rod-like member;

(f) at least one resilient spring-like element having a first end thereof positioned to abuttingly engage said at least one load bearing load transfer shoulder carried by said generally hollow housing member and an opposed second end thereof positioned to abuttingly engage said at least one load bearing load transfer shoulder carried by said flange-like portion of said rod-like member; and (g) at least one pressure sensing means positioned to face a predetermined end of said at least one resilient spring-like element for measuring an amount of pressure being exerted by an axial force being applied to said at least one resilient spring-like element in said at least one predetermined direction by such coupling mechanism during operation of such first vehicle and such second vehicle, wherein said apparatus further includes:

(h) at least a second load bearing load transfer shoulder being carried by said generally hollow housing member, said at least a second load bearing load transfer shoulder being located in a second predetermined plane which is substantially perpendicular to said longitudinal axis of said generally hollow housing member, each of said at least one load bearing load transfer shoulder and said at least a second load bearing load transfer shoulder being carried by said generally hollow housing member being substantially parallel to one another;

(i) at least a second load bearing load transfer shoulder being carried by said flange-like portion of said rod-like member, said at least a second load bearing load transfer shoulder being carried by said flange-like portion of said rod-like member facing said at least a second load bearing load transfer shoulder carried by said generally hollow housing member and being in a second predetermined plane which is substantially perpendicular to said longitudinal axis of said rod-like member, each of said at least one load bearing load transfer shoulder and said at least a second load bearing load transfer shoulder being carried by said flange-like portion of said rod-like member being substantially parallel to one another; and (j) at least a second resilient spring-like element, a first end of said at least a second resilient spring-like element is positioned to abuttingly engage said at least a second load bearing load transfer shoulder carried by said generally hollow housing member and an opposed second end of said at least a second resilient spring-like element is positioned to abuttingly engage said at least a second load bearing load transfer shoulder carried by said flange-like portion on said rod-like member, wherein said apparatus measures an axial force transmitted by a coupling vehicle in a pair of substantially axially opposed directions and said apparatus further includes at least a second pressure sensing means positioned to face a predetermined end of said at least a second resilient spring-like element for measuring an amount of pressure being exerted by an axial force being applied to said at least a second resilient spring-like element in a substantially axially opposite direction to said at least one predetermined direction by such coupling mechanism during operation of such vehicle, wherein each of said at least one resilient spring-like element and said at least a second resilient spring-like element is formed as a generally solid element from an elastomer-type material, wherein said apparatus further includes a summation unit which receives a positive signal from first one of said at least one pressure sensing means and said at least a second pressure sensing means and a negative signal from a second one of said at least one pressure sensing means and said at least a second pressure sensing means, said summation unit generates a signal representing a resulting axial force according to both an amount of said axial force and a direction of said axial force from said positive signal and said negative signal.

51. An apparatus for measuring an axially directed force which is transmitted in at least one predetermined direction by a coupling mechanism utilized to connect one end of a first vehicle to an adjacent end of a second vehicle, said axially directed force being transmitted during movement of such first vehicle and such second vehicle over at least one of a roadway surface and a railway surface, said apparatus for measuring said axially directed force comprising:

(a) a generally hollow housing member, said generally hollow housing member having a capability of being engaged with at least one of such one end of such first vehicle and such adjacent end of such second vehicle;

(b) at least one load bearing load transfer shoulder being carried by said generally hollow housing member, said at least one load bearing load transfer shoulder being located in a first predetermined plane, said first predetermined plane being disposed substantially perpendicular to a longitudinal axis of said generally hollow housing member;

(c) a rod-like member, at least a portion of said rod-like member being disposed for axial movement within said generally hollow housing member, said rod-like member having a longitudinal axis which is disposed at least substantially parallel to said longitudinal axis of said generally hollow housing member;

(d) a flange-like portion, said flange-like portion being disposed on a portion of an outer surface of said rod-like member intermediate each end of said rod-like member;

(e) at least one load bearing load transfer shoulder being carried by said flange-like portion on said rod-like member, said at least one load bearing load transfer shoulder carried by said flange-like portion on said rod-like member faces said at least one load bearing load transfer shoulder carried by said generally hollow housing member in a substantially parallel manner and is disposed in a first predetermined plane which is substantially perpendicular to said longitudinal axis of said rod-like member;

(f) at least one resilient spring-like element having a first end thereof positioned to abuttingly engage said at least one load bearing load transfer shoulder carried by said generally hollow housing member and an opposed second end thereof positioned to abuttingly engage said at least one load bearing load transfer shoulder carried by said flange-like portion of said rod-like member; and (g) at least one pressure sensing means positioned to face a predetermined end of said at least one resilient spring-like element for measuring an amount of pressure being exerted by an axial force being applied to said at least one resilient spring-like element in said at least one predetermined direction by such coupling mechanism during operation of such first vehicle and such second vehicle, wherein said apparatus further includes:

(h) at least a second load bearing load transfer shoulder being carried by said generally hollow housing member, said at least a second load bearing load transfer shoulder being located in a second predetermined plane which is substantially perpendicular to said longitudinal axis of said generally hollow housing member, each of said at least one load bearing load transfer shoulder and said at least a second load bearing load transfer shoulder being carried by said generally hollow housing member being substantially parallel to one another;

(i) at least a second load bearing load transfer shoulder being carried by said flange-like portion of said rod-like member, said at least a second load bearing load transfer shoulder being carried by said flange-like portion of said rod-like member facing said at least a second load bearing load transfer shoulder carried by said generally hollow housing member and being in a second predetermined plane which is substantially perpendicular to said longitudinal axis of said rod-like member, each of said at least one load bearing load transfer shoulder and said at least a second load bearing load transfer shoulder being carried by said flange-like portion of said rod-like member being substantially parallel to one another; and (j) at least a second resilient spring-like element, a first end of said at least a second resilient spring-like element is positioned to abuttingly engage said at least a second load bearing load transfer shoulder carried by said generally hollow housing member and an opposed second end of said at least a second resilient spring-like element is positioned to abuttingly engage said at least a second load bearing load transfer shoulder carried by said flange-like portion on said rod-like member, wherein said apparatus measures an axial force transmitted by a coupling vehicle in a pair of substantially axially opposed directions and said apparatus further includes at least a second pressure sensing means positioned to face a predetermined end of said at least a second resilient spring-like element for measuring an amount of pressure being exerted by an axial force being applied to said at least a second resilient spring-like element in a substantially axially opposite direction to said at least one predetermined direction by such coupling mechanism during operation of such vehicle, wherein each of said at least one resilient spring-like element and said at least a second resilient spring-like element is formed as a generally solid element from an elastomer-type material, wherein said rod-like member forms at least a portion of a coupling jaw member of such coupling mechanism, wherein said apparatus further includes a summation unit which receives a positive signal from first one of said at least one pressure sensing means and said at least a second pressure sensing means and a negative signal from a second one of said at least one pressure sensing means and said at least a second pressure sensing means, said summation unit generates a signal representing a resulting axial force according to both an amount of said axial force and a direction of said axial force from said positive signal and said negative signal.

52. An apparatus for measuring an axially directed force which is transmitted in at least one predetermined direction by a coupling mechanism utilized to connect one end of a first vehicle to an adjacent end of a second vehicle, said axially directed force being transmitted during movement of such first vehicle and such second vehicle over at least one of a roadway surface and a railway surface, said apparatus for measuring said axially directed force comprising:

(a) a generally hollow housing member, said generally hollow housing member having a capability of being engaged with at least one of such one end of such first vehicle and such adjacent end of such second vehicle;

(b) at least one load bearing load transfer shoulder being carried by said generally hollow housing member, said at least one load bearing load transfer shoulder being located in a first predetermined plane, said first predetermined plane being disposed substantially perpendicular to a longitudinal axis of said generally hollow housing member;

(c) a rod-like member, at least a portion of said rod-like member being disposed for axial movement within said generally hollow housing member, said rod-like member having a longitudinal axis which is disposed at least substantially parallel to said longitudinal axis of said generally hollow housing member;

(d) a flange-like portion, said flange-like portion being disposed on a portion of an outer surface of said rod-like member intermediate each end of said rod-like member;

(e) at least one load bearing load transfer shoulder being carried by said flange-like portion on said rod-like member, said at least one load bearing load transfer shoulder carried by said flange-like portion on said rod-like member faces said at least one load bearing load transfer shoulder carried by said generally hollow housing member in a substantially parallel manner and is disposed in a first predetermined plane which is substantially perpendicular to said longitudinal axis of said rod-like member;

(f) at least one resilient spring-like element having a first end thereof positioned to abuttingly engage said at least one load bearing load transfer shoulder carried by said generally hollow housing member and an opposed second end thereof positioned to abuttingly engage said at least one load bearing load transfer shoulder carried by said flange-like portion of said rod-like member; and (g) at least one pressure sensing means positioned to face a predetermined end of said at least one resilient spring-like element for measuring an amount of pressure being exerted by an axial force being applied to said at least one resilient spring-like element in said at least one predetermined direction by such coupling mechanism during operation of such first vehicle and such second vehicle, wherein said apparatus further includes:

(h) at least a second load bearing load transfer shoulder being carried by said generally hollow housing member, said at least a second load bearing load transfer shoulder being located in a second predetermined plane which is substantially perpendicular to said longitudinal axis of said generally hollow housing member, each of said at least one load bearing load transfer shoulder and said at least a second load bearing load transfer shoulder being carried by said generally hollow housing member being substantially parallel to one another;

(i) at least a second load bearing load transfer shoulder being carried by said flange-like portion of said rod-like member, said at least a second load bearing load transfer shoulder being carried by said flange-like portion of said rod-like member facing said at least a second load bearing load transfer shoulder carried by said generally hollow housing member and being in a second predetermined plane which is substantially perpendicular to said longitudinal axis of said rod-like member, each of said at least one load bearing load transfer shoulder and said at least a second load bearing load transfer shoulder being carried by said flange-like portion of said rod-like member being substantially parallel to one another; and (j) at least a second resilient spring-like element, a first end of said at least a second resilient spring-like element is positioned to abuttingly engage said at least a second load bearing load transfer shoulder carried by said generally hollow housing member and an opposed second end of said at least a second resilient spring-like element is positioned to abuttingly engage said at least a second load bearing load transfer shoulder carried by said flange-like portion on said rod-like member, wherein said apparatus measures an axial force transmitted by a coupling vehicle in a pair of substantially axially opposed directions and said apparatus further includes at least a second pressure sensing means positioned to face a predetermined end of said at least a second resilient spring-like element for measuring an amount of pressure being exerted by an axial force being applied to said at least a second resilient spring-like element in a substantially axially opposite direction to said at least one predetermined direction by such coupling mechanism during operation of such vehicle, wherein each of said at least one resilient spring-like element and said at least a second resilient spring-like element is formed as a generally solid element from an elastomer-type material, wherein said rod-like member forms at least a portion of a coupling jaw member of such coupling mechanism, wherein said flange-like portion on said rod-like member includes at least one cavity formed therein adjacent said at least one load bearing load transfer shoulder in which said at least one pressure sensing means is at least partially positioned and at least a second cavity formed therein adjacent said at least a second load bearing load transfer shoulder in which said at least a second pressure sensing means is at least partially positioned, wherein said apparatus further includes a first pressure transfer element disposed intermediate said at least one pressure sensing means and said predetermined end of said at least one resilient spring-like element and a second pressure transfer element disposed intermediate said at least a second pressure sensing means and said predetermined end of said at least a second resilient spring-like element, wherein said apparatus further includes a summation unit which receives a positive signal from first one of said at least one pressure sensing means and said at least a second pressure sensing means and a negative signal from a second one of said at least one pressure sensing means and said at least a second pressure sensing means, said summation unit generates a signal representing a resulting axial force according to both an amount of said axial force and a direction of said axial force from said positive signal and said negative signal.

53. An apparatus for measuring an axially directed force which is transmitted in at least one predetermined direction by a coupling mechanism utilized to connect one end of a first vehicle to an adjacent end of a second vehicle, said axially directed force being transmitted during movement of such first vehicle and such second vehicle over at least one of a roadway surface and a railway surface, said apparatus for measuring said axially directed force comprising:

(a) a generally hollow housing member, said generally hollow housing member having a capability of being engaged with at least one of such one end of such first vehicle and such adjacent end of such second vehicle;

(b) at least one load bearing load transfer shoulder being carried by said generally hollow housing member, said at least one load bearing load transfer shoulder being located in a first predetermined plane, said first predetermined plane being disposed substantially perpendicular to a longitudinal axis of said generally hollow housing member;

(c) a rod-like member, at least a portion of said rod-like member being disposed for axial movement within said generally hollow housing member, said rod-like member having a longitudinal axis which is disposed at least substantially parallel to said longitudinal axis of said generally hollow housing member;

(d) a flange-like portion, said flange-like portion being disposed on an outer surface of said rod-like member intermediate each end of said rod-like member;

(e) at least one load bearing load transfer shoulder being carried by said flange-like portion on said rod-like member, said at least one load bearing load transfer shoulder carried by said flange-like portion on said rod-like member faces said at least one load bearing load transfer shoulder carried by said generally hollow housing member in a substantially parallel manner and is disposed in a first plane which is substantially perpendicular to said longitudinal axis of said rod-like member;

(f) at least one resilient elastomer-type spring-like element having a first end thereof positioned to abuttingly engage said at least one load bearing load transfer shoulder carried by said generally hollow housing member and an opposed second end thereof positioned to abuttingly engage said at least one load bearing load transfer shoulder carried by said flange-like portion of said rod-like member;

(g) at least one pressure sensing means positioned within said at least one resilient elastomer-type spring-like element for measuring an amount of pressure being exerted by an axial force being applied within said at least one resilient elastomer-type spring-like element in said at least one predetermined direction by such coupling mechanism during operation of such first vehicle and such second vehicle, wherein said apparatus further includes:

(h) at least a second load bearing load transfer shoulder being carried by said generally hollow housing member, said at least a second load bearing load transfer shoulder being located in a second predetermined plane which is substantially perpendicular to said longitudinal axis of said generally hollow housing member, each of said at least one load bearing load transfer shoulder and said at least a second load bearing load transfer shoulder being carried by said generally hollow housing member being substantially parallel to one another;

(i) at least a second load bearing load transfer shoulder being carried by said flange-like portion of said rod-like member, said at least a second load bearing load transfer shoulder being carried by said flange-like portion of said rod-like member facing said at least a second load bearing load transfer shoulder carried by said generally hollow housing member and being in a second predetermined plane which is substantially perpendicular to said longitudinal axis of said rod-like member, each of said at least one load bearing load transfer shoulder and said at least a second load bearing load transfer shoulder being carried by said flange-like portion of said rod-like member being substantially parallel to one another; and (j) at least a second resilient elastomer-type spring-like element, a first end of said at least a second resilient elastomer-type spring-like element is positioned to abuttingly engage said at least a second load bearing load transfer shoulder carried by said generally hollow housing member and an opposed second end of said at least a second resilient elastomer-type spring-like element is positioned to abuttingly engage said at least a second load bearing load transfer shoulder carried by said flange-like portion on said rod-like member, wherein said apparatus measures an axial force transmitted by a coupling vehicle in a pair of substantially axially opposed directions and said apparatus further includes at least a second pressure sensing means positioned within said at least a second resilient elastomer-type spring-like element for measuring an amount of pressure being exerted by an axial force being applied to said at least a second resilient spring-like element in a substantially axially opposite direction to said at least one predetermined direction by such coupling mechanism during operation of such vehicle, wherein each of said at least one resilient elastomer-type spring-like element and said at least a second resilient elastomer-type spring-like element include an aperture formed therethrough to enable passing a portion of said rod-like member through said aperture, wherein said at leas one resilient elastomer-type spring-like element is positioned between said at least one load bearing load transfer shoulder carried by said generally hollow housing member and said at least one load bearing load transfer shoulder carried by said flange-like portion on said rod-like member under a predetermined amount of prestress and said at least a second resilient elastomer-type spring-like element is positioned between said at least a second load bearing load transfer shoulder carried by said generally hollow housing member and said at least a second load bearing load transfer shoulder carried by said flange-like portion on said rod-like member under a substantially identical amount of prestress as said at least one resilient elastomer-type spring-like element.

54. An apparatus for measuring an axial force being transmitted by a vehicle coupling mechanism, according to claim 53, wherein said apparatus further includes a summation unit which receives a positive signal from a first one of said at least one pressure sensing means and said at least a second pressure sensing means and a negative signal from a second one of said at least one pressure sensing means and said at least a second pressure sensing means, said summation unit generates a signal representing a resulting axial force according to both an amount of said axial force and a direction of said axial force from said positive signal and said negative signal.

* * * * *